(12) United States Patent
Auweder et al.

(10) Patent No.: US 9,292,019 B2
(45) Date of Patent: Mar. 22, 2016

(54) THERMOSTAT INSERT

(75) Inventors: Andreas Auweder, Vaihingen/Enz (DE);
Martin Holzhauser, Auenwald (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 569 days.

(21) Appl. No.: 13/810,312

(22) PCT Filed: Jul. 12, 2011

(86) PCT No.: PCT/EP2011/061863
§ 371 (c)(1),
(2), (4) Date: Apr. 26, 2013

(87) PCT Pub. No.: WO2012/019852
PCT Pub. Date: Feb. 16, 2012

(65) Prior Publication Data
US 2013/0200167 A1    Aug. 8, 2013

(30) Foreign Application Priority Data

Jul. 27, 2010 (DE) .......................... 10 2010 033 564

(51) Int. Cl.
*G05D 23/02* (2006.01)
*F01P 7/16* (2006.01)

(52) U.S. Cl.
CPC . *G05D 23/02* (2013.01); *F01P 7/16* (2013.01); *G05D 23/022* (2013.01)

(58) Field of Classification Search
CPC .................................. F01P 7/16; G05D 23/022
USPC ........................................................ 236/34.5
See application file for complete search history.

(56) References Cited

U.S. PATENT DOCUMENTS 3,792,813 A    2/1974  Saur et al.
4,032,067 A *  6/1977  Hanaoka .............. G05D 23/022
                                                      236/34.5

(Continued)

FOREIGN PATENT DOCUMENTS

DE      31 01 248 A1    2/1982
DE      88 01 797 U1    5/1988

(Continued)

OTHER PUBLICATIONS

International Search Report, PCT/EP2011/061863, Dec. 7, 2011, 3 pgs.
German Search Report, DE 10 2010 033 564.9, Apr. 15, 2011, 4 pgs.

*Primary Examiner* — Jonathan Bradford
(74) *Attorney, Agent, or Firm* — Paul D. Strain, Esq.; Strain & Strain PLLC

(57) ABSTRACT

The invention relates to a thermostat insert having at least one return spring, a thermostatic working element having a working piston that can be pushed out of a housing of the working element against the force of the return spring, a main valve element, and a short circuit valve element connected to the working element displaced when the working piston is pushed out of the housing, a base element implemented as a base plate, and a brace on which the return spring is supported, wherein the brace is mechanically connected to the base element, so that the return spring is enclosed in a cage-like manner, and the exterior of the brace has a closed peripheral collar seated against a slanted sealing surface of a counterpart after installation that is loaded by the return spring so that the brace is sealingly forced in the direction of the slanted sealing surface.

11 Claims, 8 Drawing Sheets

(56) References Cited

U.S. PATENT DOCUMENTS

Figure 4:
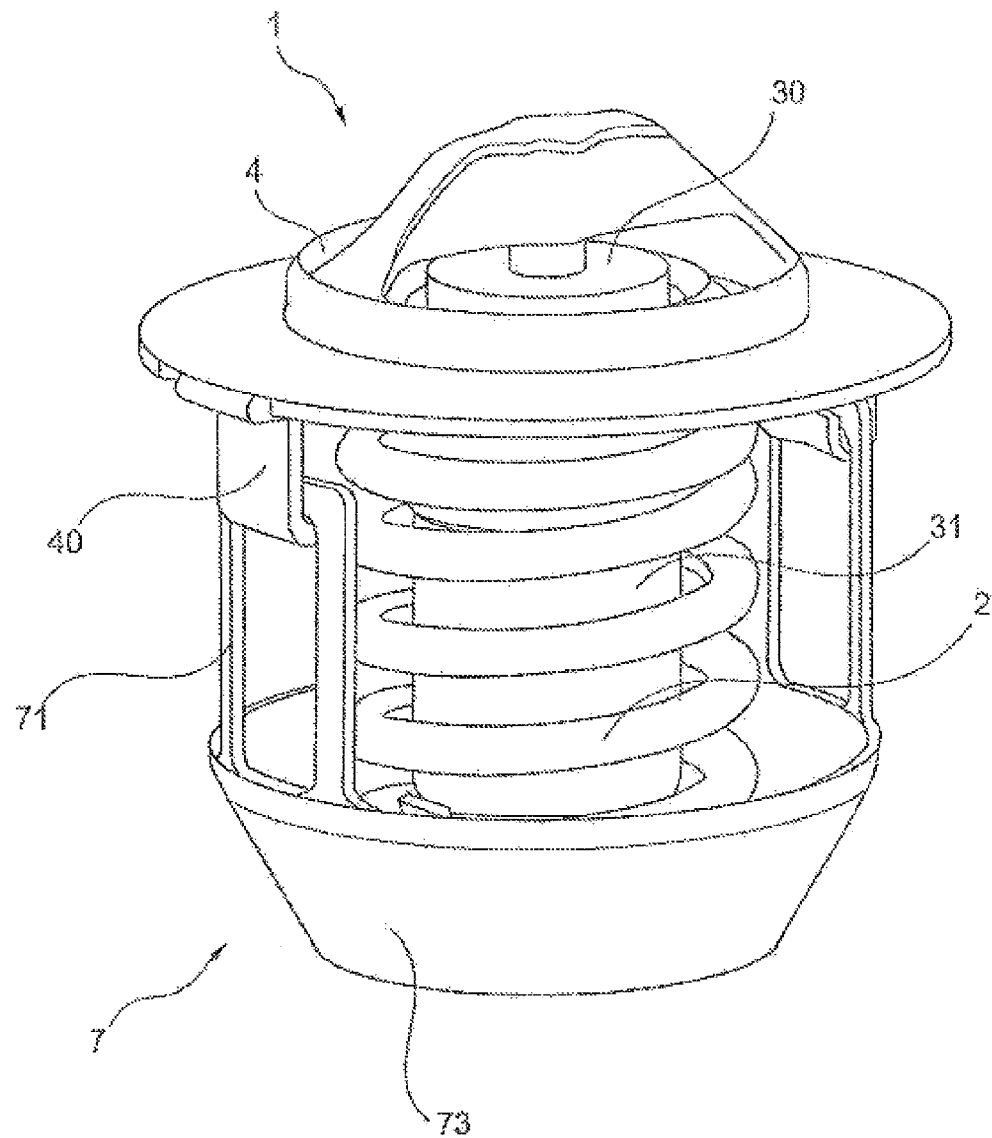

| | | |
|---|---|---|
| 4,196,847 A | 4/1980 | Gobien |
| 4,524,907 A * | 6/1985 | Wong .................. G05D 23/022 236/100 |
| 5,381,952 A | 1/1995 | Duprez |
| 2008/0135633 A1 * | 6/2008 | Heldberg .............. F16K 31/002 236/34.5 |
| 2010/0012738 A1 | 1/2010 | Park |

FOREIGN PATENT DOCUMENTS

| | | |
|---|---|---|
| DE | 94 07 641 U1 | 7/1994 |
| DE | 195 45 081 A1 | 6/1997 |
| DE | 694 16 390 T2 | 6/1999 |
| EP | 0 661 486 A1 | 7/1995 |
| EP | 1 821 018 A1 | 8/2007 |
| EP | 2 104 015 A2 | 9/2009 |
| WO | WO 2005/068799 A1 | 7/2005 |

* cited by examiner

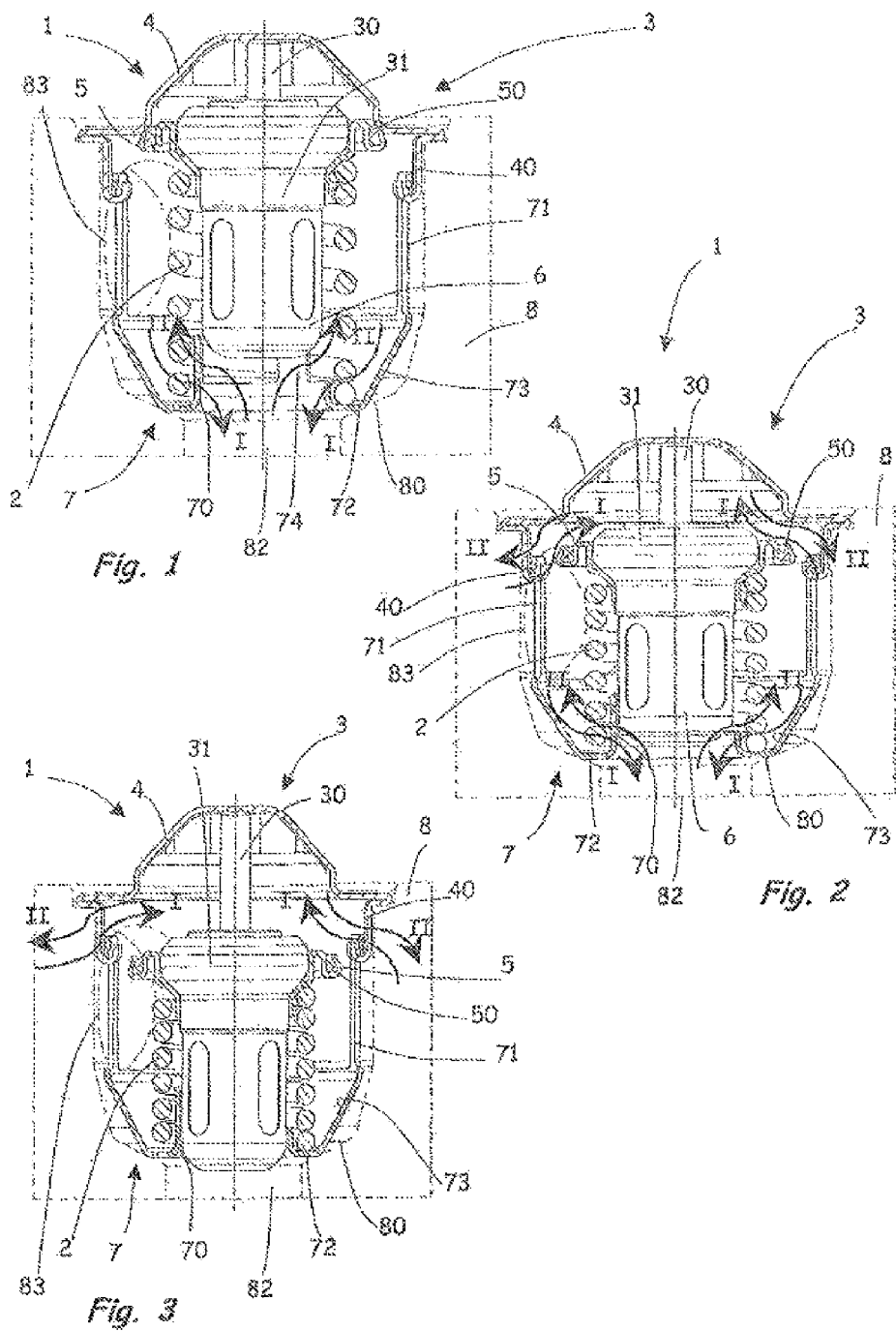

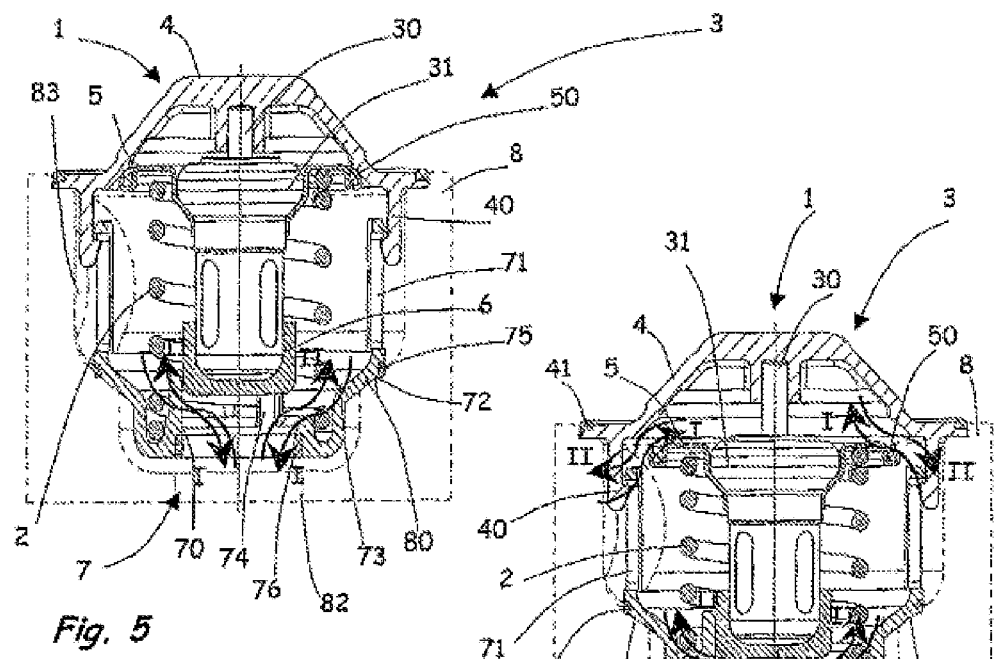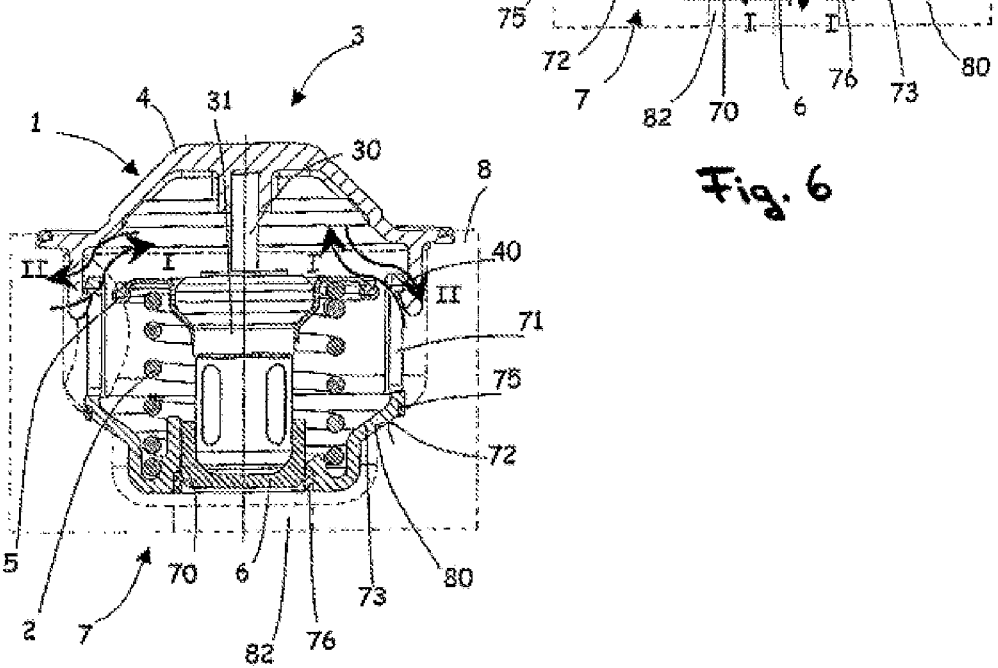

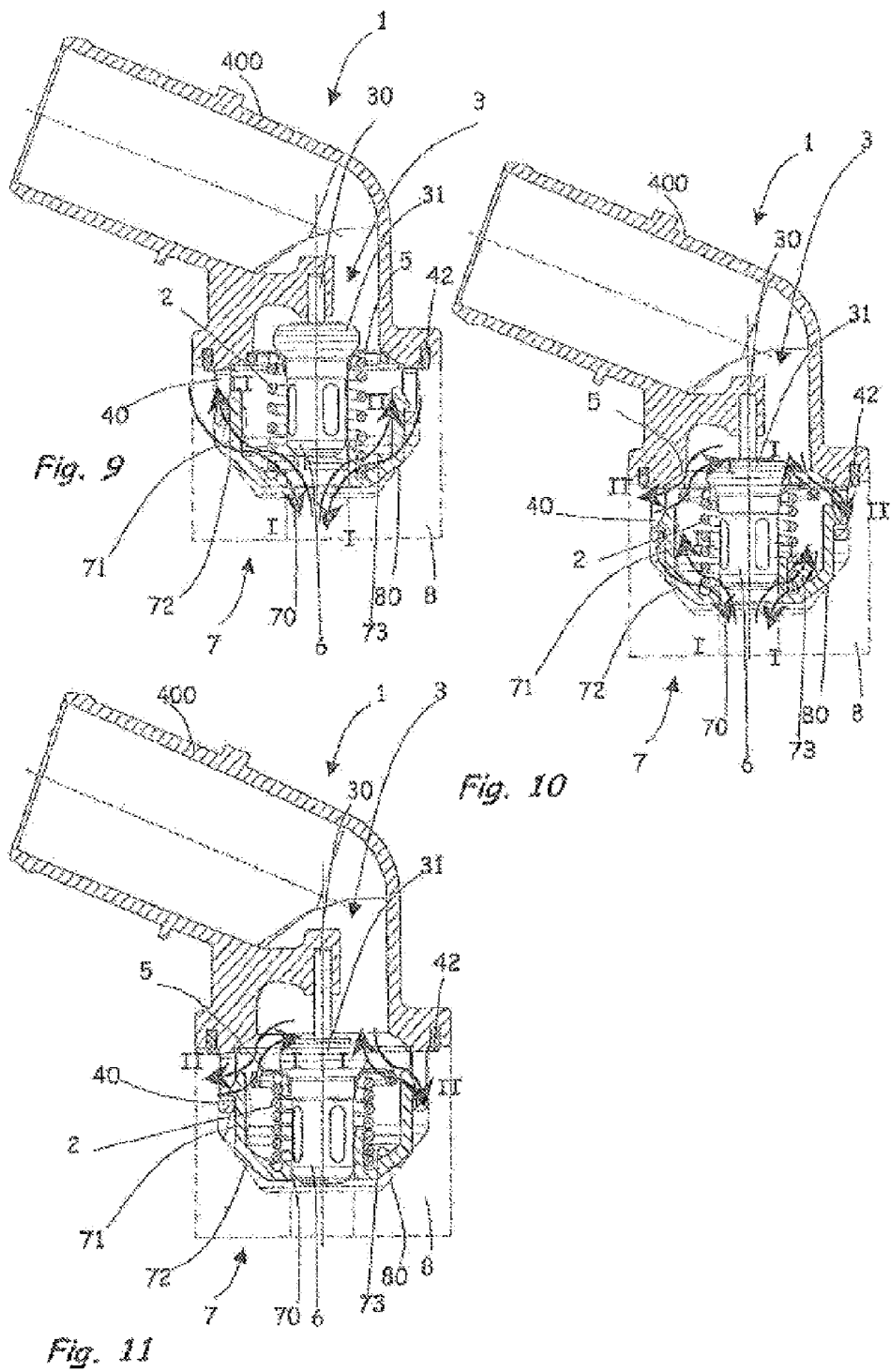

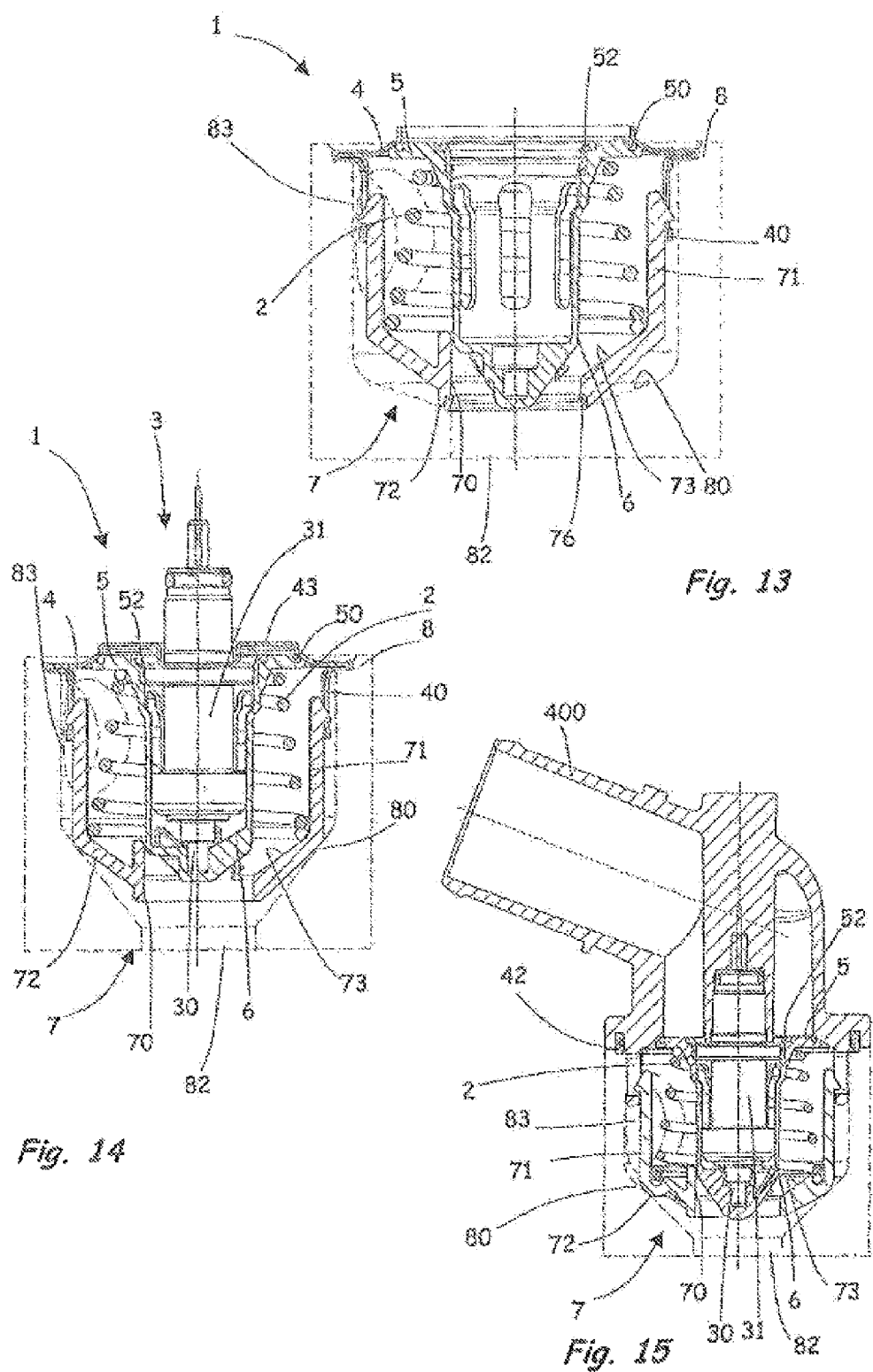

THERMOSTAT INSERT

CROSS-REFERENCE TO RELATED PATENT APPLICATIONS

This application is a National Stage of International Application No. PCT/EP2011/061863, filed Jul. 12, 2011, which is based upon and claims the benefit of priority from prior German Patent Application No. 10 2010 033 564.9, filed Jul. 27, 2010, the entire contents of all of which are incorporated herein by reference in their entirety.

The invention relates to a thermostat insert having an integrated bypass valve with the function of a 3/2-way valve for a cooling circuit.

A thermostat insert of this type can be used, for example, in a cooling circuit of an internal combustion engine and serves, for example, to divide coolant flows for engine outlet regulation, it being possible for a coolant flow which comes from an internal combustion engine to be divided as a function of a coolant temperature, in order to feed the coolant flow, depending on the temperature, via a radiator or completely or partially directly again to the internal combustion engine. As an alternative, a thermostat insert can also be used for engine inlet regulation.

It is known to form what is known as a mixing chamber which is delimited in the direction of the radiator by a main valve and in the direction of a bypass channel by a bypass valve. In the case of engine outlet regulation, the mixing chamber is also called distributor chamber. In conjunction with the invention, however, both a distributor chamber in the case of engine outlet regulation and a mixing chamber in the case of engine inlet regulation are uniformly called mixing chamber. In order to achieve rapid response of the thermostatic working element, the thermostat valve is arranged in the mixing chamber, with the result that it is flowed around by the coolant flow both in bypass operation, mixing operation and in radiator operation.

WO 2005/068799 A1 has disclosed a thermostat insert comprising a thermostatic working element with a movably mounted housing, a valve unit being mounted on the housing and the housing being displaceable counter to the force of a restoring spring. The valve unit has a main valve member and a bypass valve member which is arranged such that it is spaced apart axially from the former, a main valve or a bypass valve optionally being opened or closed by displacement of the housing. The restoring spring is supported on an abutment. The abutment guides the housing during a displacement and also acts as valve seat for the bypass valve. In bypass operation, the bypass valve member impairs the incident flow of the thermostatic working element in an arrangement of this type.

EP 2 104 015 A1 has likewise disclosed a thermostat insert having an abutment which is designed as valve seat for the bypass valve. Here, the bypass valve member is designed as a bypass slide. Here, the abutment is connected to a thermostat housing and is inserted into a bypass channel of a counterpiece.

It is an object of the invention to provide a thermostat insert which has a small number of individual components and can be attached in a sealing manner as a preassembled assembly on a counterpiece, and which has satisfactory flow conditions in radiator operation and in bypass operation.

This object is achieved by a thermostat insert comprising a restoring spring, a thermostatic working element with a working plunger which can be driven out of a housing of the working element counter to the force of the restoring spring, a main valve element and a bypass valve element which are connected to the element which is moved when the working plunger is driven out of the housing, a basic element and an abutment, on which the restoring spring is supported, the abutment being connected mechanically to the basic element, with the result that an assembly is formed which surrounds the restoring spring in a cage-like manner, and, on its outer side, the abutment has a collar which is circumferential in a closed manner, bears against an oblique sealing face of a counterpiece after installation and is loaded by the restoring spring, with the result that the abutment is forced in a sealing manner in the direction of the sealing face.

In advantageous refinements, the basic element is configured as a base plate.

In the thermostat insert according to the invention, the bypass valve is integrated in the thermostat insert, closing of the main valve, of the bypass valve and sealing of the bypass channel being realized by means of a restoring spring. The thermostat insert has the conventional function of a 3/2-way valve for a cooling circuit.

In one refinement, the restoring spring is of conical design. In advantageous refinements, the restoring spring is of cylindrical design, in order to rule out faulty assembly.

The thermostatic working element, in particular an expansion material, the main valve and the bypass valve are adjusted with respect to one another in such a way that, as a function of a temperature of the coolant which flows around the thermostatic working element, first of all the main valve opens when the working plunger is driven out, the bypass valve remaining open for mixing operation. During a further stroke of the working plunger, the bypass valve closes.

In one refinement, the abutment and the basic element, in particular the base plate, are coupled rigidly to one another or are configured in one piece.

In advantageous refinements, a mechanical coupling is realized in such a way that the coupled components can be displaced relative to one another counter to a force of the restoring spring. As a result, tolerance compensation is possible during the installation, the abutment being forced against the counterpiece in a sealing manner. In a refinement of this type, it is possible to dispense with sealing elements in the contact region with the counterpiece.

In one advantageous refinement, the abutment has at least two webs which are connected mechanically to corresponding brackets of the basic element. The abutment thus permits satisfactory flow around the thermostatic working element which is arranged within the abutment.

In one refinement, the webs and the brackets are configured as corresponding hoops and hooks, the hooks being hooked into the hoops, in particular being hooked in a displaceable manner. On account of the displaceable connection, it is possible that the components move relative to one another during assembly and the abutment is thus forced in the direction of the sealing face of the counterpiece on account of the force of the restoring spring. In other refinements, sealing elements are provided on the sealing faces and/or on the abutment, which sealing elements prevent a leak on account of manufacturing tolerances or the like.

In advantageous refinements, the bypass valve element is designed as an annular slide, the abutment having a bypass channel which is designed as a receptacle and can be closed by means of the bypass valve element. The bypass valve element and the receptacle have shapes which correspond to one another; both are preferably of rotationally symmetrical design, in particular of cylindrical design, with the result that a relative rotation of the components is possible without tilting during the displacement of the bypass valve element.

In some refinements, the housing of the working element serves as bypass valve element, a surface treatment of the housing, for example a coating, being provided in one refinement. In another refinement, the bypass valve element has a sleeve which is arranged on the element, preferably on the housing, which sleeve is moved when the working plunger is driven out. The diameter of the bypass valve element is increased by way of the sleeve. It is possible as a result to provide a larger bypass channel without increasing the diameter of the housing or the working plunger overall, a flow around the working elements during bypass operation being improved, in particular, in the case of engine inlet regulation.

In advantageous refinements, the basic element has a valve seat for the main valve element. Here, in some refinements, the basic element is designed as a base plate, on which the working plunger or the housing is supported. For this purpose, the base plate has, for example, a hoop. In other refinements, the basic element is designed as a thermostat housing. Here, the thermostat insert is configured as an integral thermostat, the abutment also being called a crossmember or intermediate wall.

In yet further refinements, the basic element is configured in one piece with the main valve element. As a result it is possible to further reduce the number of individual components. Here, the working plunger of the working element is preferably unloaded before installation of the thermostat insert between two housing parts and is supported on one of the housing parts after the installation.

In advantageous refinements, the abutment is of funnel-shaped configuration at least in sections, with the result that the thermostatic working element is washed around. As a result, flow is improved, in particular, in bypass operation.

Further advantages of the invention result from the subclaims and from the following description of exemplary embodiments of the invention which are shown diagrammatically in the drawings. Uniform designations are used in the drawings for identical or similar components. Features which are described or shown as part of one exemplary embodiment can likewise be used in another exemplary embodiment, in order to obtain a further embodiment of the invention.

Figure 8:
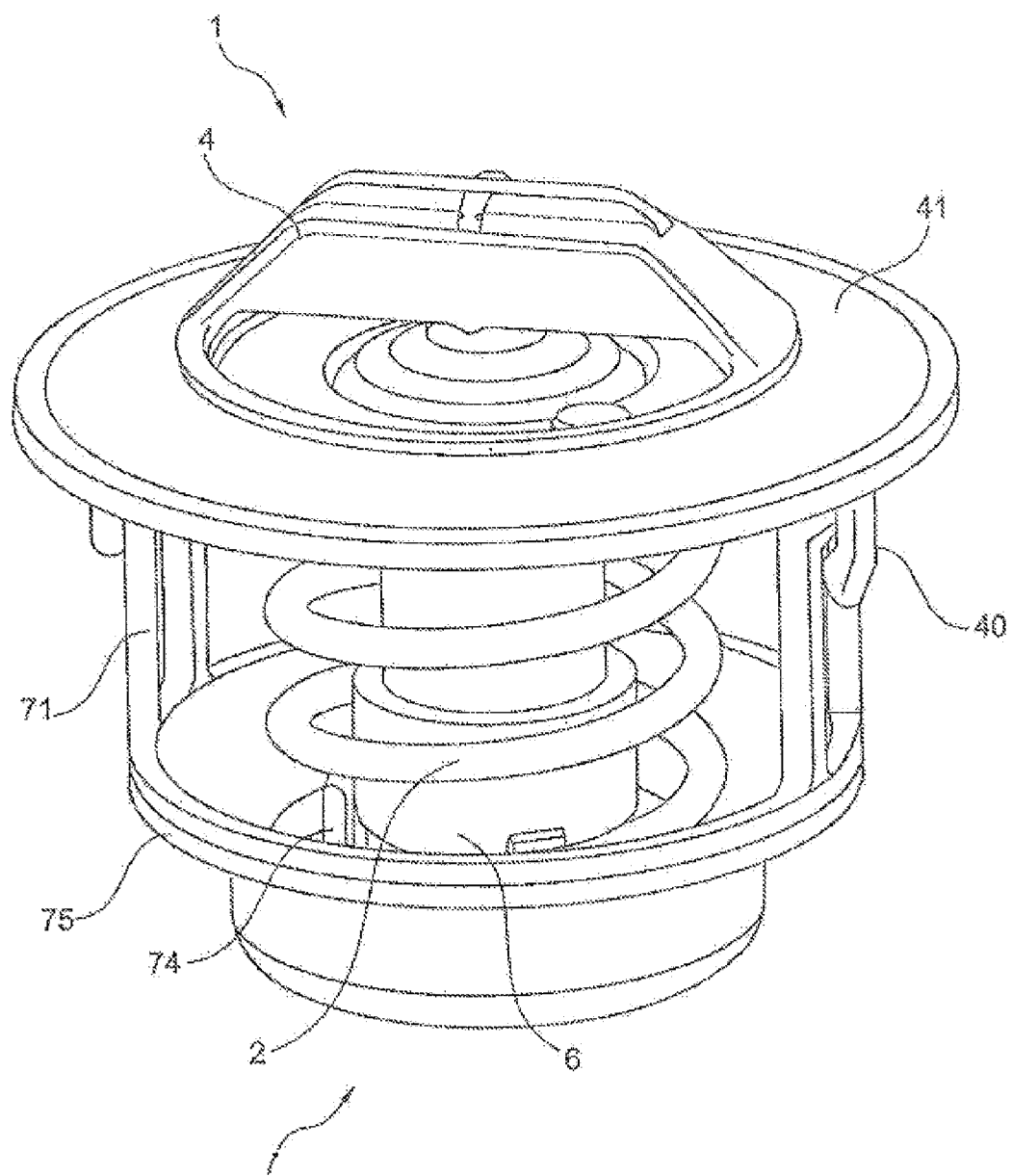
Figure 12:
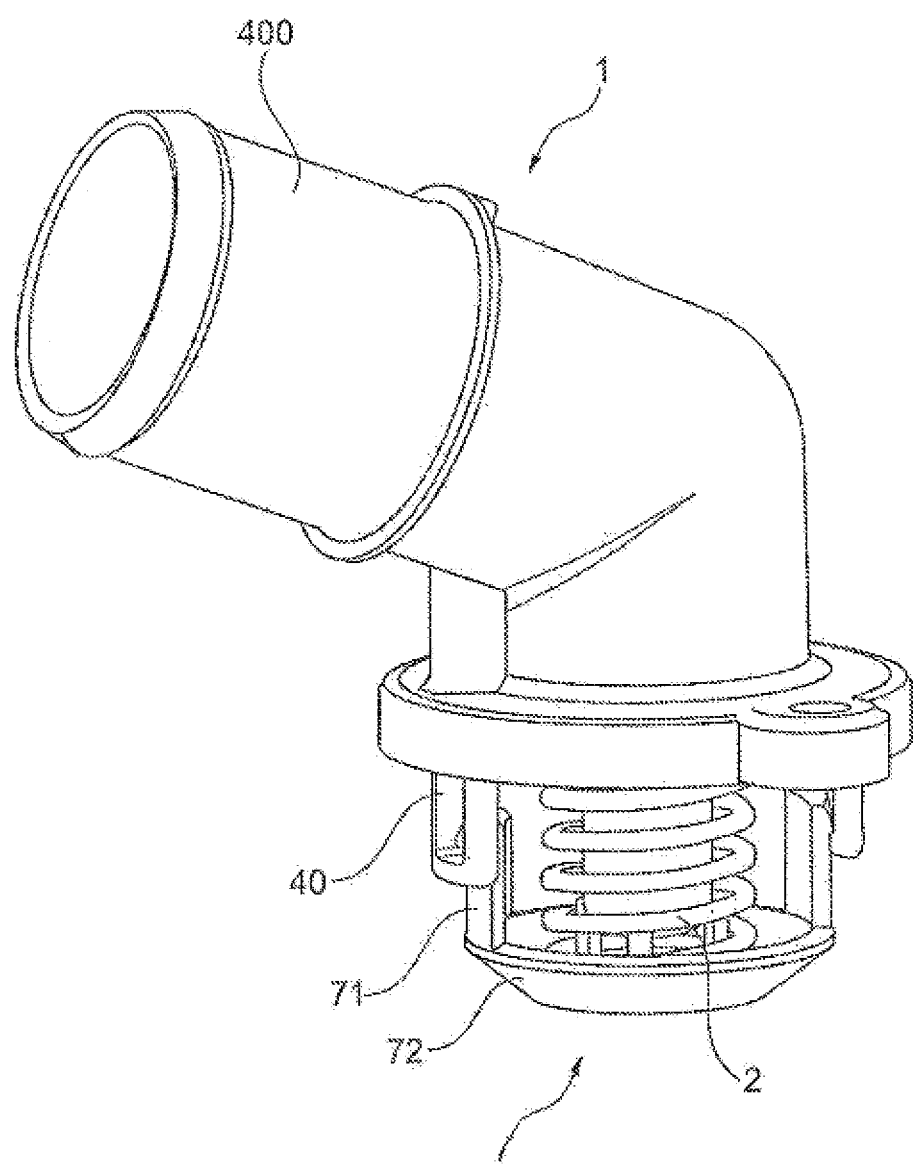
Figures 16, 17:
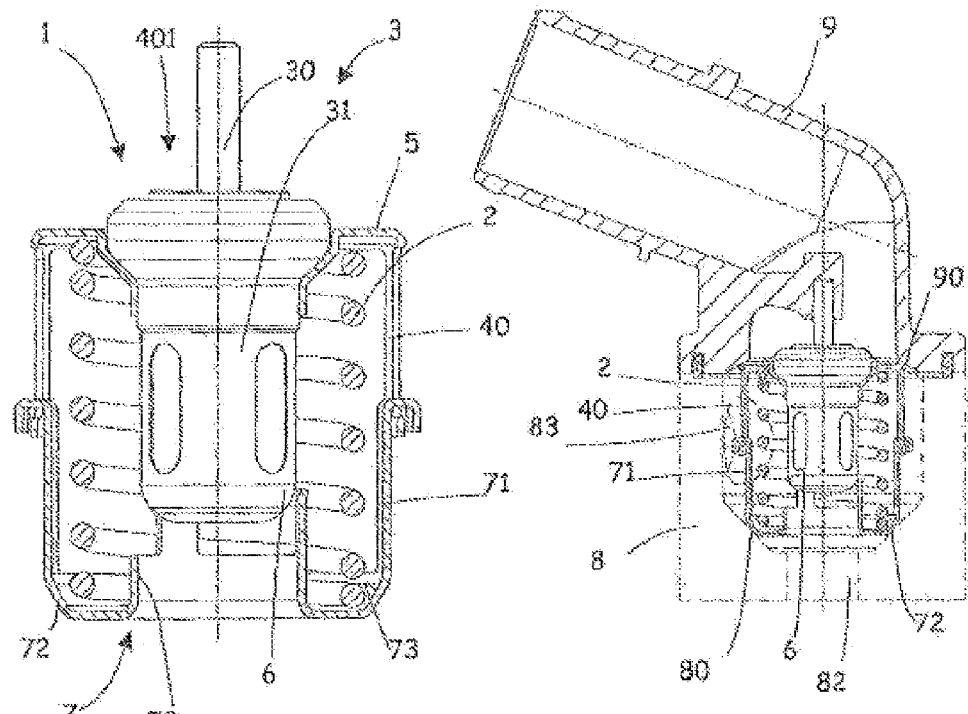
Figures 18, 19:
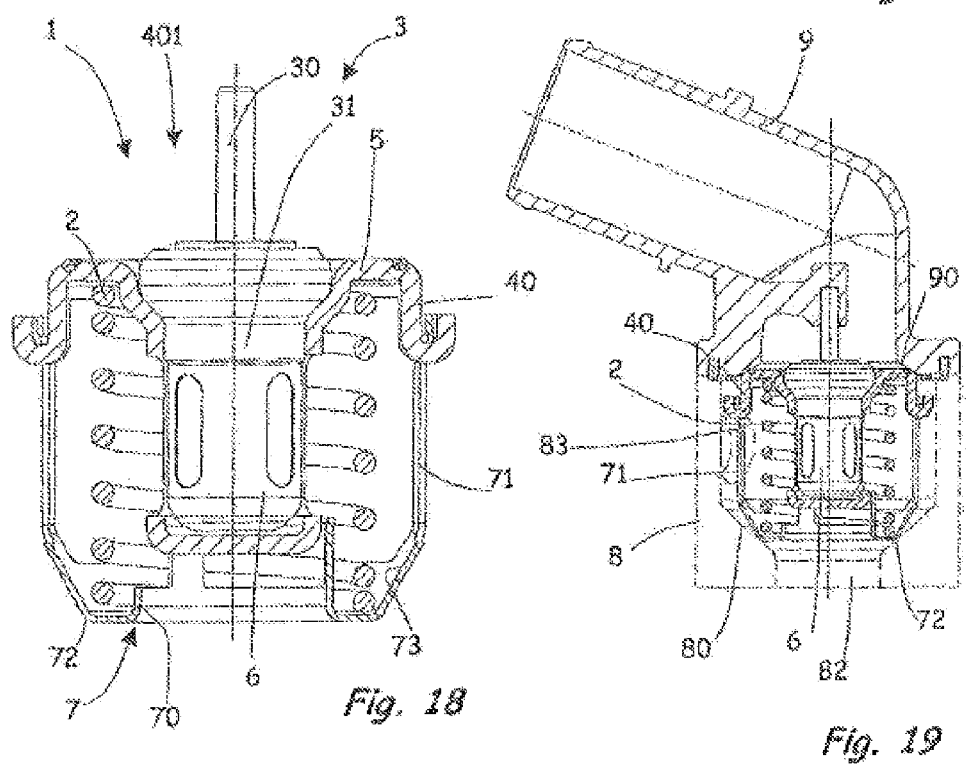

In the drawings:

FIG. 1 shows a sectional view of a first exemplary embodiment of a thermostat insert in bypass operation, FIG. 2 shows a sectional view of the thermostat insert according to FIG. 1 in mixing operation, FIG. 3 shows a sectional view of the thermostat insert according to FIG. 1 in radiator operation, FIG. 4 shows an isometric illustration of the thermostat insert according to FIG. 1, FIG. 5 shows a sectional view of a second exemplary embodiment of a thermostat insert in bypass operation, FIG. 6 shows a sectional view of the thermostat insert according to FIG. 5 in mixing operation, FIG. 7 shows a sectional view of the thermostat insert according to FIG. 5 in radiator operation, FIG. 8 shows an isometric illustration of the thermostat insert according to FIG. 5, FIG. 9 shows a sectional view of a third exemplary embodiment of a thermostat insert in bypass operation, FIG. 10 shows a sectional view of the thermostat insert according to FIG. 9 in mixing operation, FIG. 11 shows a sectional view of the thermostat insert according to FIG. 9 in radiator operation, FIG. 12 shows an isometric illustration of the thermostat insert according to FIG. 9, FIG. 13 shows a sectional view of a fourth exemplary embodiment of a thermostat insert in bypass operation, FIG. 14 shows a sectional view of a fifth exemplary embodiment of a thermostat insert in bypass operation, FIG. 15 shows a sectional view of a sixth exemplary embodiment of a thermostat insert in bypass operation, FIG. 16 shows a sectional view of a seventh exemplary embodiment of a thermostat insert in bypass operation, FIG. 17 shows a sectional view of the thermostat insert according to FIG. 16 in an installed situation, FIG. 18 shows a sectional view of an eighth exemplary embodiment of a thermostat insert in bypass operation, and FIG. 19 shows a sectional view of the thermostat insert according to FIG. 18 in an installed situation.

FIGS. 1 to 4 show a first embodiment of a thermostat insert 1 according to the invention in bypass operation, mixing operation, radiator operation and in an isometric illustration, respectively.

The thermostat insert 1 comprises a restoring spring 2, a thermostatic working element 3 with a working plunger 30 which can be driven out of a housing 31 of the working element 3 counter to the force of the restoring spring 2. Furthermore, the thermostat insert 1 comprises a basic element which is configured as a base plate 4 and on which the working plunger 30 is supported. When the working plunger is driven out of the housing 31, the housing 31 is displaced counter to the force of the restoring spring 2, on account of heating of the expansion material which is arranged in the housing 31. The restoring spring 2 is supported on an abutment 7. A main valve element 5 and a bypass valve element 6 are connected to the housing 31. The base plate 4 acts as valve seat for the main valve element 5, the main valve element 5 being forced onto the base plate 4 by means of the restoring spring 2. In the region of the valve seat, the main valve element 5 has, for example, a sealing ring 50. The bypass valve element 6 is configured in one piece with a cylindrical shank of the housing 31. The abutment 7 has a receptacle 70 which corresponds to the shape of the bypass valve element 6. In the embodiment which is shown, the shank of the housing 31 and therefore the bypass valve element 6 and the corresponding receptacle 70 are of cylindrical configuration. The bypass valve is closed by the bypass valve element 6 dipping into the corresponding receptacle 70.

Furthermore, the abutment 7 has a plurality of hoop-shaped webs 71, two webs 71 in the exemplary embodiment which is shown, which extend in the direction of the base plate 4 in the axial direction of the thermostat insert 1. The webs 71 are hooked into corresponding brackets 40 which are formed on the base plate 4. For assembly, the thermostatic working element 3 and the restoring spring 2 are inserted between the base plate 4 and the abutment 7, and the webs 71 are hooked into the brackets 40 by compression of the restoring spring 2. On account of the restoring force of the restoring spring 2, the abutment 7 is connected mechanically to the base plate 4 after withdrawal of the force which is necessary for the compression, with the result that an assembly is formed. Even after being hooked in, the brackets 40 and webs 71 can also be displaced relative to one another counter to the force of the restoring spring 2.

The thermostat insert 1 is inserted into a counterpiece 8 which is shown by way of dashed lines. Furthermore, FIGS. 1 to 4 diagrammatically show a bypass channel 82 and a channel 83 to the engine. The main valve element 5 is arranged between the channel 83 to the engine and the radiator inlet or outlet. On its outer side, the abutment 7 has a collar 72 which is circumferential in a closed manner, adjoins the receptacle 70 and bears against an oblique sealing face 80 of the counterpiece 8 after installation. The abutment 7 closes the bypass channel 82 apart from a throughflow via the receptacle 70. The collar 72 is loaded by the restoring spring 2, with the result that the abutment 7 is forced in a sealing manner in the direction of the oblique sealing face 80.

The counterpiece 8 is, for example, a water pump housing, a cylinder block, a crankcase or the like. The oblique sealing face 80 preferably has a slope of approximately 45°. The oblique sealing face 80 makes satisfactory centering during assembly possible and satisfactory sealing with little or no leakage during operation. In the installed situation, the brackets 40 and webs 71 are relieved by the abutment 7 being pressed onto the counterpiece 8 by means of the restoring spring 2.

The abutment 7 which is shown has a funnel-shaped section 73 in an inflow region. The flow conditions in bypass operation (FIG. 1) and in mixing operation (FIG. 2) are improved by the funnel-shaped section 73.

The thermostat insert 1 can be used both in engine inlet regulation and in engine outlet regulation. The figures diagrammatically show the coolant flows in engine inlet regulation and in engine outlet regulation by way of arrows. Here, the arrows which are labeled with I show engine outlet regulation and the arrows which are labeled with II show engine inlet regulation.

The thermostat insert 1 has the conventional function of a 3/2-way valve for a cooling circuit, the bypass valve being integrated into the thermostat insert 1. In the case of a rising temperature of the cooling medium which flows around the thermostatic working element 3, the working plunger 30 is driven out of the housing 31. In the exemplary embodiment which is shown in FIGS. 1 to 4, the shank, designed as bypass valve element 6, of the housing 31 dips here into the receptacle 70 which is formed on the abutment 7, in order to close the cylindrical receptacle 70 radially. As a result, a bypass valve is formed with a reduction in the individual components in the installed situation which is shown in FIGS. 1 to 3.

In the exemplary embodiment which is shown, the brackets 40 reach inward into the webs 71. In other refinements, the brackets 40 reach outward. Furthermore, it is conceivable to configure the webs with hooks which reach into associated hoops on the brackets 40. The connection by means of webs 71 and brackets 40 also serves as transport securing means before installation into the counterpiece.

The receptacle 70 is adjoined by ribs 74 which extend in the direction of the base plate 4 and which guide the housing 31 during the movement. Here, the number of ribs 74 is selected in such a way that satisfactory throughflow and satisfactory guidance of the housing 31 are ensured. Here, three or five ribs 74 have proven to be advantageous.

The forces which act on the thermostatic working element 3 are lower as a result of the fact that only one restoring spring 2 is provided, with the result that a thermostatic working element 3 can be used which is dimensioned to be smaller than the prior art with two restoring springs.

In the exemplary embodiment which is shown in FIGS. 1 to 4, the abutment 7 and the base plate 4 are configured as punched parts. Here, manufacturing as a punched part is possible with low waste. In other refinements, one of the components or both components is/are configured as a plastic part.

FIGS. 5 to 8 show a second embodiment of a thermostat insert 1 according to the invention in bypass operation, mixing operation, radiator operation and in an isometric illustration, respectively. The thermostat insert 1 is similar to the thermostat insert 1 according to FIGS. 1 to 4, and uniform designations are used for identical or similar components. A detailed description of said components has been partially dispensed with.

The thermostat insert 1 comprises a basic element, configured as a base plate 4, and an abutment 7, which are configured in each case as plastic parts. Here, the abutment 7 is shaped in such a way that the collar 72 is configured with a sleeve-shaped region and the funnel-shaped section 73, support on the counterpiece taking place via an edge of the collar 72. In one advantageous refinement, an elastomer which is processed by means of two-component plastic technology is used as plastic.

Here, an axial seal 75 is additionally used or attached in the edge region of the collar 72, also called edge. In the exemplary embodiment which is shown, the seal 75 is molded on as a two-component plastic part. In other refinements, the seal 75 is designed as a toroidal sealing ring or O-ring. In yet other refinements, a radial seal is provided. Here, it is further provided in one refinement that the base plate 4 and the abutment 7 are connected rigidly to one another or are of single-piece design. On account of the seal 75, sufficient security against leakage is ensured in the region of the sealing face 80.

In the exemplary embodiment which is shown, the bypass valve element 6 is designed as a cap-shaped sleeve which is mounted on the housing 31. It is possible as a result to provide a larger bypass channel 82, without the housing 31 in its entirety being designed with a larger diameter.

In one refinement, a toroidal sealing ring or O-ring is inserted into the receptacle 70 for improved sealing of the bypass valve. In the refinement which is shown, an elastomer layer is provided as seal 76 in the region of the receptacle 70.

The base plate 4 and the abutment 7 are produced, for example, by means of plastic injection molding, the seals 75, 76 and a further seal 41 being molded directly onto the base plate 4. As a result, it is possible to dispense with a further assembly step.

FIGS. 9 to 12 show a third embodiment of a thermostat insert 1 according to the invention which is configured as an integral thermostat in bypass operation, mixing operation, radiator operation and in an isometric illustration, respectively. The thermostat insert 1 is similar to the thermostat insert 1 according to FIGS. 1 to 4, and uniform designations are used for identical or similar components. A detailed description of said components is dispensed with.

In the refinement according to FIGS. 9 to 12, a thermostat housing 400 is provided as basic element. The abutment 7 acts as crossmember. The thermostat housing 400 has brackets 40 which are of hoop-shaped design. Webs 71 of the abutment 7 which are designed as hooks engage into the brackets 40. The thermostat insert 1 can be mounted on a counterpiece 8, profile seals 42 against external leakage being provided between the thermostat insert 1 and the counterpiece 8. The abutment 7 which is shown is made from plastic and is supported on the counterpiece 8 via a collar 72. In other refinements, a sheet metal part is provided.

FIGS. 13 to 15 show further embodiments of a thermostat insert 1 according to the invention, having a thermostatic working element 3 which is configured as an electronic working element 3 or engine map working element 3. However, the abutment 7 which is shown in FIGS. 13 to 15 can also be used for a conventional working element 3 which is arranged so as to be rotated by 180° in comparison with FIGS. 1 to 4. The thermostat insert 1 is similar to the thermostat insert 1 according to FIGS. 1 to 4, and uniform designations are used for identical or similar components. A detailed description of said components is partially dispensed with.

In the exemplary embodiment having an engine map working element 3, the housing 31 is mounted statically, it being possible for an expansion material which is arranged in the housing 31 to be additionally electrically heated, in order to achieve a desired response behavior.

Here, FIG. 13 shows one refinement having a base plate 4 which has an opening which points in the direction of a housing (not shown in FIG. 13). The base plate 4 is designed as a punched part, whereas the abutment 7 is configured as a plastic part. The circumferential collar 72 comprises a sleeve-shaped section and the funnel-shaped section 73, a support being provided on the counterpiece 8 in the region of an outer end of the receptacle 70 for the bypass valve element 6. Here, the seal 76 is provided both for radially sealing the bypass valve element 6 and for axially sealing the abutment 7. The bypass valve element 6 and the main valve element 5 are configured in one piece as a plastic part. Here, a further seal 52 is provided in the region of the receptacle for the housing 31 of the working element 3. Here, the seals 50, 52 can be integrated in the component during the injection molding of the component.

FIG. 14 shows a refinement which is similar to FIG. 13, the base plate 4 having a hoop 43. Here, the variant according to FIG. 13 without the hoop 43 is advantageous in some refinements for incident flow of the working element 3 and for avoiding influences on account of the heat transmission of the hoop 43. In the refinement according to FIG. 14, the abutment 7 is of similar design to FIG. 13, a support on the counterpiece 8 being provided on an outer edge of the collar 72.

FIG. 15 shows one exemplary embodiment which is similar to FIGS. 13 and 14, the thermostat insert 1 being configured as an integral thermostat with a thermostat housing 400. Here, a support on the counterpiece 8 is likewise provided on the edge of the collar 72.

FIGS. 16 to 19 show further embodiments of a thermostat insert 1 according to the invention, the basic element 401 being configured in one piece with the main valve element 5. Here, in the refinement according to FIGS. 16 and 17, the basic element 401 is configured as a punched part and, in the refinement according to FIGS. 18 and 19, as a plastic part. Here, FIGS. 16 and 18 in each case show the thermostat insert 1 in a mounted state before installation, and FIGS. 17 and 19 show the thermostat insert 1 according to FIG. 16 and FIG. 17, respectively, in an installed situation.

The basic element 401 has brackets 40 which are connected mechanically to webs 71 of an abutment 7, with the result that an assembly is formed which surrounds a restoring spring 2 in a cage-like manner. Here, the webs 71 and the brackets 40 are connected displaceably to one another, with the result that the basic element 401 can be displaced with the main valve element 5 counter to the force of the restoring spring 2 in order to open the main valve.

In the exemplary embodiment according to FIGS. 16 and 17, the basic element 401 has a mushroom-shaped edge for its function as main valve element 5. A pressure loss in the case of engine inlet regulation can be minimized by way of an edge of this type. The webs 71 have hooks, by way of which they engage into hoop-shaped regions of the brackets 40.

In the exemplary embodiment according to FIGS. 18 and 19, the basic element 401 likewise has a mushroom-shaped edge for its function as main valve element 5. The brackets 40 have hooks, by way of which they engage into hoop-shaped regions of the webs 71.

As can be seen in FIGS. 17 and 19, a counterpiece 8 which is shown using dashed lines has an oblique sealing face for the abutment 7, the restoring spring 2 forcing the abutment 7 onto the oblique sealing face 80. The main valve element 5 interacts with a valve seat 90 which is formed in a housing 9, the valve seat 90 likewise being designed with a slope. The mounting of the thermostat insert 1 is simplified further by the additional slope.

The invention claimed is:

1. A thermostat insert comprising;
at least one restoring spring,
a thermostatic working element with a working plunger which can be driven out of a housing of the working element counter to the force of the restoring spring,
a main valve element and a bypass valve element which are connected to the working element which is moved when the working plunger is driven out of the housing,
a basic element and an abutment, on which the restoring spring is supported, the abutment being connected mechanically to the basic element, with the result that an assembly is formed which surrounds the restoring spring in a cage-like manner, wherein, on its outer side, the abutment has a collar which is circumferential in a closed manner, bears against an oblique sealing face of a counterpiece after installation and is loaded by the restoring spring, with the result that the abutment is forced in a sealing manner in the direction of the oblique sealing face,
wherein the abutment has at least two webs which are connected mechanically to corresponding brackets of the basic element, wherein the webs and the brackets are configured as corresponding hoops and hooks, the hooks being hooked into the hoops.

2. The thermostat insert as claimed in claim 1, wherein the abutment and the basic element are connected such that they can be displaced counter to the force of the restoring spring.

3. The thermostat insert as claimed in claim 1, wherein the abutment has a bypass channel which is designed as a receptacle and can be closed by the bypass valve element.

4. The thermostat insert as claimed in claim 3, wherein the bypass valve element has a sleeve which is arranged on the working element, which sleeve is moved when the working plunger is driven out.

5. The thermostat insert as claimed in claim 1, wherein the basic element has a valve seat for the main valve element.

6. The thermostat insert as claimed in claim 1, wherein the basic element is designed as a base plate, on which the working plunger or the housing is supported.

7. The thermostat insert as claimed in claim 1, wherein the basic element is designed as a thermostat housing.

8. The thermostat insert as claimed in claim 1, wherein the basic element is configured in one piece with the main valve element.

9. The thermostat insert as claimed in claim 1, wherein the abutment is of funnel-shaped configuration at least in sections, with the result that the thermostatic working element is washed around.

10. The thermostat insert as claimed in claim 1, wherein the hooks are hooked in a displaceable manner.

11. The thermostat insert as claimed in claim 4, wherein the sleeve of the bypass valve element is arranged on the housing of the working element.

* * * * *